US006796460B2

(12) United States Patent
Ichikawa et al.

(10) Patent No.: US 6,796,460 B2
(45) Date of Patent: Sep. 28, 2004

(54) CARTRIDGE FOR FLUID MATERIAL AND DISPENSING APPARATUS FOR SUCH A CARTRIDGE

(75) Inventors: Tooru Ichikawa, Chiyoda-ku (JP); Youji Tanaka, Kawasaki (JP); Satoru Kimura, Bunkyo-ku (JP); Masahiro Ito, Arakawa-ku (JP)

(73) Assignees: Hosokawa Yoko Co., LTD (JP); Kabushiki Kaisha Polymer Systems (JP)

( * ) Notice: Subject to any disclaimer, the term of this patent is extended or adjusted under 35 U.S.C. 154(b) by 217 days.

(21) Appl. No.: 10/170,207

(22) Filed: Jun. 13, 2002

(65) Prior Publication Data

US 2002/0190084 A1 Dec. 19, 2002

(30) Foreign Application Priority Data

Jun. 14, 2001 (JP) .................................... P2001-179811

(51) Int. Cl.[7] ................................................ G01F 11/06

(52) U.S. Cl. ...................... 222/105; 222/327; 222/386; 222/391

(58) Field of Search ........................... 222/92, 95, 105, 222/107, 326, 327, 386, 386.5, 387, 391

(56) References Cited

U.S. PATENT DOCUMENTS

| | | | | | |
|---|---|---|---|---|---|
| 3,282,473 | A | * | 11/1966 | Moore | 222/327 |
| 3,997,085 | A | | 12/1976 | Lindquist | 222/326 |
| 4,067,479 | A | | 1/1978 | Moline | 222/94 |
| 4,979,649 | A | | 12/1990 | Wescott | 222/174 |
| 5,595,327 | A | | 1/1997 | Dentler et al. | 222/327 |
| 5,667,102 | A | * | 9/1997 | Keller | 222/95 |
| 6,158,621 | A | * | 12/2000 | Keller | 222/95 |
| 6,264,066 | B1 | * | 7/2001 | Vincent et al. | 222/95 |
| 6,334,548 | B1 | * | 1/2002 | Ichikawa et al. | 222/107 |
| 6,521,158 | B2 | * | 2/2003 | Ichikawa et al. | 264/251 |

FOREIGN PATENT DOCUMENTS

| | | |
|---|---|---|
| CH | 672 472 A5 | 11/1989 |
| EP | 0860377 A1 | 2/1997 |
| GB | 2 305 160 A | 4/1997 |
| JP | 03200576 | 9/1991 |

* cited by examiner

*Primary Examiner*—Kenneth Bomberg
(74) *Attorney, Agent, or Firm*—Parkhurst & Wendel, L.L.P.

(57) ABSTRACT

A cartridge for fluid material comprises a tubular receiver and a plunger. The tubular receiver is provided at its front end portion with an outlet opening. The plunger is disposed in the tubular receiver at its rear end portion so as to be slidable therein. The tubular receiver is formed of a thin film.

9 Claims, 16 Drawing Sheets

CARTRIDGE FOR FLUID MATERIAL AND DISPENSING APPARATUS FOR SUCH A CARTRIDGE

BACKGROUND OF THE INVENTION

1. Field of the Invention

The present invention relates to a cartridge, which receives therein fluid material such as mayonnaise, toothpaste and calking agent and a dispensing apparatus such as a dispensing gun for discharging the fluid material from the cartridge.

2. Description of the Related Art

The conventional cartridge of this kind is provided with a tubular receiver "a" having a cylindrical shape, a cap member "b" disposed at the front end of the tubular receiver "a" and a plunger "c" disposed in the tubular receiver at its rear end portion so as to be slidable therein, as shown in FIG. 21. The cap member "b" has an outlet opening "b1" formed in the middle of the cap member "b". The above-mentioned outlet opening "b1" is closed by means of a thin sealing member "d". The inner cavity of the tubular receiver "a" between the cap member "b" and the plunger "c" is filled with fluid material.

When the fluid material is discharged from the above-described cartridge, a single set or a plurality of sets of slits "d1" having a cross-shape is previously formed on the sealing member "d", as shown in FIG. 23. Such a cartridge is fitted in a dispensing apparatus (not shown) such as a dispensing gun. Then, actuation of a piston (not shown) of the dispensing apparatus moves the plunger "c" toward the cam member "b". As a result, the fluid material received in the tubular receiver "a" is discharged outside through the slits "d1".

When the plunger "c" moves to discharge the fluid material from the tubular receiver "a", a frictional resistance, which is caused between the outer peripheral surface of the plunger "c" and the inner surface of the tubular receiver "a", generates a relatively large pressing force applied to the tubular receiver "a" in the longitudinal direction thereof. Accordingly, it has been conceivable that the tubular receiver "a" would be collapsed in the longitudinal direction or buckling thereof would occur. In view of such an aspect, the conventional tubular receiver "a" is formed of cardboard having a high rigidity. For example, the tubular receiver "a" is prepared by rolling a piece of cardboard into a cylindrical shape, placing the one side edge of the piece of cardboard on the other side edge thereof and securing these side edges to each other by means of adhesive.

It is however difficult to collapse the tubular receiver "a" of the cartridge having the above-described structure in a small size due to the high rigidity of the tubular receiver "a", after the cartridge has served completely (more specifically, the fluid material has been discharged to be used up). This may lead to an enormous waste amount of tubular receivers "a" of the cartridges, causing social problems of waste disposal. In addition, a gap "S" is formed between the inner peripheral surface of the tubular receiver "a" and outer peripheral surface of the plunger "c" in the vicinity of the joined portion of the piece of cardboard, as shown in FIG. 22. The maximum depth of the gap "S" (i.e., the distance in the diametrical direction of the tubular receiver "a") is relatively large and equal to the thickness of the piece of cardboard forming the tubular receiver "a". This may lead to leakage of the fluid material through the gap "S", thus causing a problem. Such a leakage problem may remarkably occur when pressure is applied to the fluid material received in the tubular receiver "a" through movement of the plunger "c".

SUMMARY OF THE INVENTION

An object of the present invention is therefore to provide a cartridge for fluid material, which permits to discharge the fluid material in an appropriate manner when the cartridge is used, on the one hand, and to be collapsed in a small size, after the fluid material has been used up, on the other hand, and a dispensing apparatus for such a cartridge.

After extensive studies carried out by the present inventors to solve the above-mentioned problems, the following findings were obtained:

(1) even when the tubular receiver is formed of a thin film having a low rigidity, the tubular receiver filled with the fluid material provides a relatively large rigidity to bear force generated due to movement of the plunger;

(2) especially, when the fluid material includes fat and oil as in mayonnaise, such fat and oil reduce a frictional resistance between the inner surface of the tubular receiver and the outer surface of the plunger, thus decreasing the pressing force applied to the tubular receiver in the longitudinal direction due to the movement of the plunger; and (3) consequently, the tubular receiver, which is formed of a thin film, can sufficiently bear the pressing force applied by the plunger, without causing collapse or buckling of the tubular.

The present invention was made on the basis of the above-mentioned findings. In order to attain the aforementioned object, a cartridge of the present invention for fluid material, comprises:

a tubular receiver provided at its front end portion with an outlet opening; and a plunger disposed in said tubular receiver at its rear end portion so as to be slidable therein, wherein:

said tubular receiver is formed of a thin film.

The tubular receiver may be provided on its outer peripheral surface at a rear end thereof, in which the plunger is fitted, with a reinforcement member having a ring-shape.

The tubular receiver may be provided on its inner peripheral surface between the rear end portion thereof and the plunger with a reinforcement member having a ring-shape.

The tubular receiver may be provided on its outer peripheral surface at a rear end thereof with at least one stopper member, said stopper member projecting outwardly in a diametrical direction of the tubular receiver. The above-mentioned stopper member may be formed into a ring-shape.

The cartridge of the present invention may further comprises an outer tube having rigidity, into which said tubular receiver is to be detachably inserted from the front end portion thereof, said outer tube having an end, which is to be brought into contact with said stopper member of said tubular receiver so as to prevent said tubular receiver from moving relative to said outer tube in a direction from the rear end portion of said tubular receiver toward the front end portion thereof.

The tubular receiver may have on its outer peripheral surface a plurality of reinforcing ribs extending in a longitudinal direction of said tubular receiver, each of said plurality of reinforcing ribs having opposite ends, which are connected to the rear end portion and the front end portion of said tubular receiver, respectively, so as to prevent said tubular receiver from being collapsed in the longitudinal direction thereof. The opposite ends of each of said plurality of reinforcing ribs may be detachably connected to the rear end portion and the front end portion of said tubular receiver, respectively.

The tubular receiver may taper off from the rear end portion thereof to the front end portion thereof.

A dispensing apparatus of the present invention for a cartridge for fluid material, said cartridge comprising a tubular receiver provided at its front end portion with an outlet opening and on its outer peripheral surface at a rear end thereof with at least one stopper member projecting outwardly, and a plunger disposed in said tubular receiver so as to be slidable therein, said dispensing apparatus comprises:

a support section for supporting said cartridge; and a piston for moving said plunger of said cartridge from a rear end side thereof toward a front end side thereof to discharge the fluid material received in said tubular receiver from the outlet opening, wherein:

said support section has a restricting portion, which is to be brought into contact with said stopper member of said cartridge so as to prevent said cartridge from moving in a direction from the rear end side of said cartridge to the front end side thereof.

The restricting portion of said support section may have a tubular shape so that said tubular receiver of said cartridge can be inserted from the front end portion thereof into said restricting portion; and the restricting portion may be swingably supported on said support section around an axis perpendicular to a longitudinal direction of said cartridge.

DETAILED DESCRIPTION OF THE PREFERRED EMBODIMENTS

Now, embodiments of a cartridge for fluid material of the present invention will be described in detail below with reference to FIGS. 1 to 20.

FIGS. 1 to 4 illustrate the cartridge of the first embodiment of the present invention. The cartridge 1 of the first embodiment of the present invention comprises a tubular receiver 2, a cap member 3 and a plunger 4.

Figure 2:
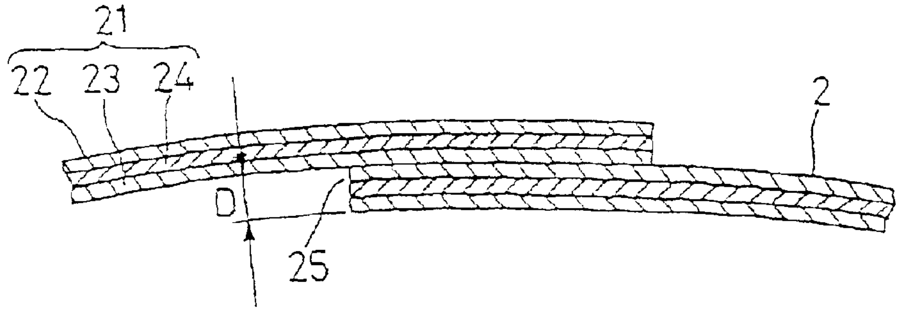
FIG. 2 is an enlarged cross-sectional view illustrating a joined portion of a thin sheet of which a tubular receiver of the cartridge as shown in FIG. 1 is formed.

The tubular receiver 2 is formed of a thin film 21 as shown in FIG. 2. The thin film 21 has a laminate structure in which a metallic foil 24 such as an aluminum foil is placed between the upper and lower resin film layers 22, 23. The thin film 21 is rolled into a cylindrical shape in a cross-section so that one side edge of the thin film 21 is placed on the other side edge thereof. These side edges of the thin film 21 are secured to each other by adhesion or fusion bonding, thereby forming the tubular receiver 2 having a cylindrical shape. In this embodiment, the tubular receiver 2 tapers off from the rear end portion (i.e., the plunger 4 side) to the front end portion (i.e., the cap member 3 side) (at a taper ratio of about 1/250). The tubular receiver 2 may have a cylindrical shape with a constant diameter in the longitudinal direction.

A gap portion 25 having the maximum depth, which is equal to the thickness "D" of the thin film 21 (i.e. the distance in the diametrical direction of the tubular receiver 2), exists in the vicinity of the joined portion of the thin film 21 of which the tubular receiver 2 is formed. Fluid material such as mayonnaise received in the tubular receiver 2 may theoretically pass through the gap portion 25 between the inner surface of the tubular receiver 2 and the outer surface of the plunger 4 to leak outside. The thin film 21 has an extremely small thickness of from about 30 $\mu$m to about 50 $\mu$m. Fitting the plunger 4 into the tubular receiver 2 causes the plunger 4F and the thin film 21 of which the tubular receiver 2 to be elastically deformed so that the depth of the gap portion 25 becomes smaller. Accordingly, there is almost no occurrence of leakage of the fluid material from the gap portion 25 in practice.

Figure 5:
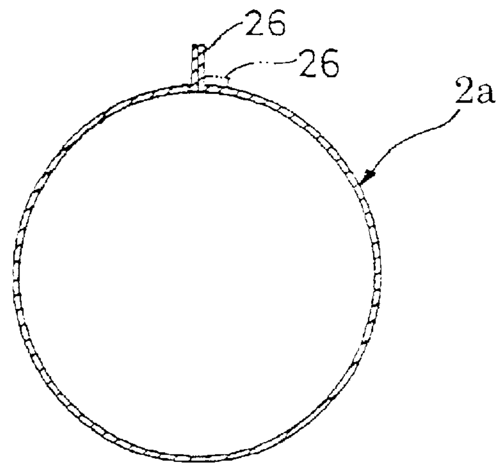
FIG. 5 is a cross-sectional view illustrating the other example of the tubular receiver used in the cartridge of the present invention.

FIG. 5 illustrates a method for manufacturing a tubular receiver 2*a*, which permits complete avoidance of formation of the above-mentioned gap portion 25. In the manufacturing method, the thin film 21 is rolled and the opposite side edges of the thin film 21 are bent outwardly substantially at right angles so that the inner surface of the one side edge of the thin film 21 comes into contact with the inner surface of the other side edge thereof. These side edges of the thin film 21 are secured to each other by adhesion or fusion bonding to form a joined portion 26. Then, the joined portion 26 is bent at its root end substantially at right angles so as to lie on the outer surface of the tubular receiver 2*a*. The joined portion 26 as bent is secured on the outer surface of the tubular receiver 2*a* by adhesion or fusion bonding. The tubular receiver 2*a* thus manufactured has no gap portion 25, which is formed on the inner surface of the tubular receiver 2. It is therefore possible to prevent the fluid material received in the tubular receiver 2*a* from leaking outside from a space between the inner surface of the tubular receiver 2*a* and the outer surface of the plunger 4 in a reliable manner.

The cap member 3, which is used to close an opening that is formed on the front end side of the tubular receiver 2, is composed of a disk-shaped portion 31 and a short sleeve portion 32, which is integrally formed with the outer periphery of the disk-shaped portion 31. The disk-shaped portion 31 has a circular discharging port 33 formed at the center of the disk-shaped portion 31. The discharging port 33 may have the other shape such as a square than the circle. The disk-shaped portion 31 is provided on its inner side with a sealing sheet 5, which is secured on the end surface of the disk-shaped portion 31 by adhesive. The sealing sheet 5 closes the discharging port 33. When the cartridge 1 is used to discharge the fluid material, a plurality of slits 51 having a cross-shape or holes is previously formed on the sealing sheet 5 so that the fluid material can be discharged from the slits 51 or the holes.

The above-mentioned sleeve portion 32 is fitted closely into the inner surface of the front portion of the tubular receiver 2 and secured thereon over its peripheral surface. Alternatively, the front end of the tubular receiver 2 may be fitted into the inner peripheral surface of the sleeve portion 32. The cam member 3 may be composed only of the disk-shaped portion 31 without any sleeve portion 32. In this case, the outer peripheral surface or the inner end surface of the disk-shaped portion 31 may be fixed to the inner peripheral surface or the front end surface of the tubular receiver 2, respectively. The step for fixing the cap member 3 to the tubular receiver 2 may be carried out by adhesion or fusion bonding. It is however preferable to apply the known insertion injection method to form the cap member 3, while fixing the cap member 3 to the tubular receiver 2. It is also preferable to form the cap member 3 of relatively hard resin so as to impart a suitable rigidity to the extent that almost no deformation occurs, even when pressure is applied to the cap member to discharge the fluid material.

Figure 1:
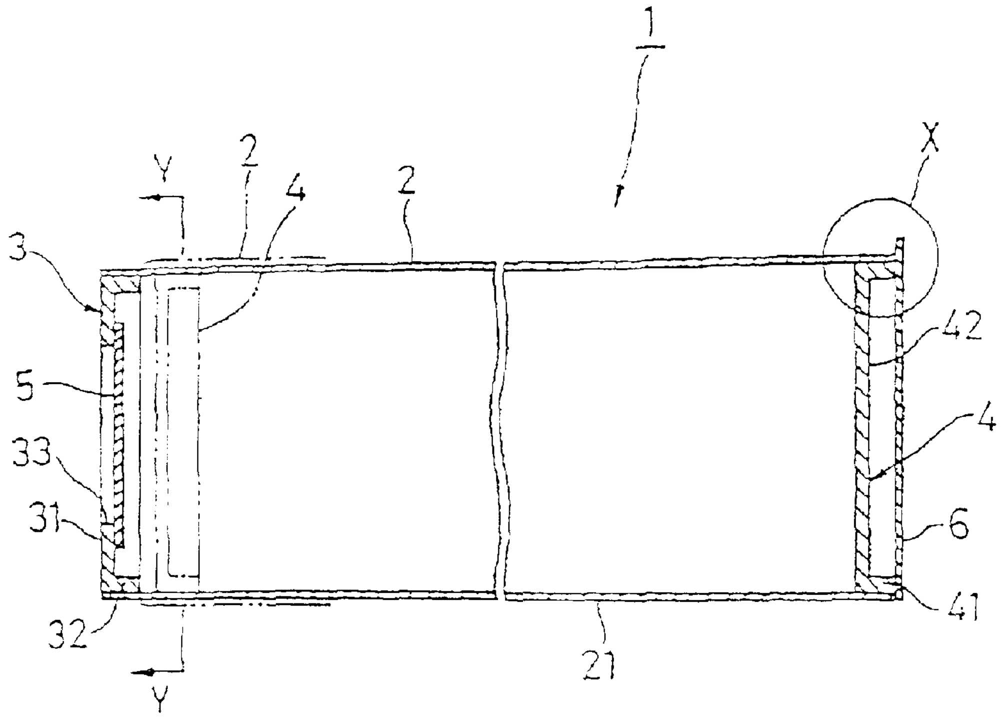
FIG. 1 is a longitudinal sectional view illustrating a cartridge of the first embodiment of the present invention.

The plunger 4, which is formed of a relatively hard resin, is composed of a short tubular sliding portion 41 having a circular shape in the cross-section and a pressure-receiving plate portion 42, which is integrally formed with the end of the sliding portion 41. The sliding portion 41 is fitted into the inner surface of the tubular receiver 2 at the rear end side thereof so as to be slidable therein. As a result, the plunger 4 closes the opening end at the rear end side of the tubular receiver 2. The cavity of the tubular receiver 2 between the plunger 4 and the cap member 3 is filled with the fluid material. Moving the plunger 4 toward the front end side of the tubular receiver 2 (i.e., the cap member 3 side) causes the fluid material received in the cartridge 1 to be discharged from the slits 51. The tubular receiver 2 tapers off from the rear end portion to the front end portion in the inside of the tubular receiver 2 so that the plunger 4 slides along the inner peripheral surface of the tubular receiver 2, while slightly expanding the tubular receiver 2 in its diametrical direction and scraping off the fluid material deposited on the inner surface of the tubular receiver 2. The fluid material can therefore be discharged without leaving the fluid material deposited on the inner surface of the tubular receiver 2. In addition, movement of the plunger 4 toward the front side of the tubular receiver 2 as shown in FIG. 1 in phantom lines causes the tubular receiver 2 to expand in its diametrical direction. Accordingly, the tubular receiver 2, which tapers off in its inside from the rear end portion to the front end portion, does not interfere with the sliding motion of the plunger 4 toward the front end portion of the tubular receiver 2.

Figure 3:
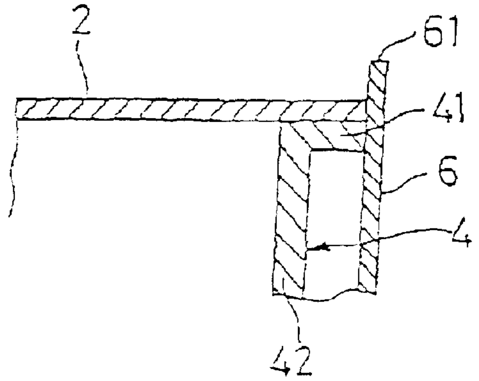
FIG. 3 is an enlarged view of a region surrounded by a circle X in FIG. 1.
Figure 4:
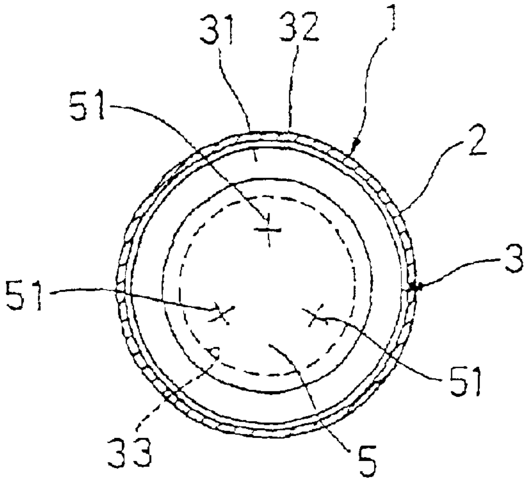
FIG. 4 is a cross-sectional view cut along the line IV—IV in FIG. 1.

The rear end of the tubular receiver 2 and the rear end of the plunger 4 on the rear end side of the cartridge 1 are flush with each other as shown in FIG. 3 so that a moisture proof sheet 6 is fitted on these rear ends of tubular receiver 2 and the plunger 4. This prevents moisture from penetrating into the tubular receiver 2 from the contact faces between the inner peripheral surface of the tubular receiver 2 and the outer peripheral surface of the plunger 4. The moisture proof sheet 6 is provided at its partial peripheral portion with a projection portion 61. When the cartridge 1 is used, the projection portion 61 is held with fingers of an operator and then peeled off, so as to remove the moisture proof sheet 6 from the respective rear ends of the tubular receiver 2 and the plunger 4.

It is preferable to bond the moisture proof sheet 6 to the rear end of the plunger 4 prior to the fitting of the plunger 4 into the tubular receiver 2, and then fit the above-mentioned plunger 4 into the tubular receiver 2 and bond the peripheral portion of the moisture proof sheet 6, which projects from the outer periphery of the plunger 4, to the rear end of the tubular receiver 2.

Now, description will be given below of how to use the cartridge 1 having the above-described structure, i.e., how to discharge the fluid material from the cartridge 1.

Figure 6:
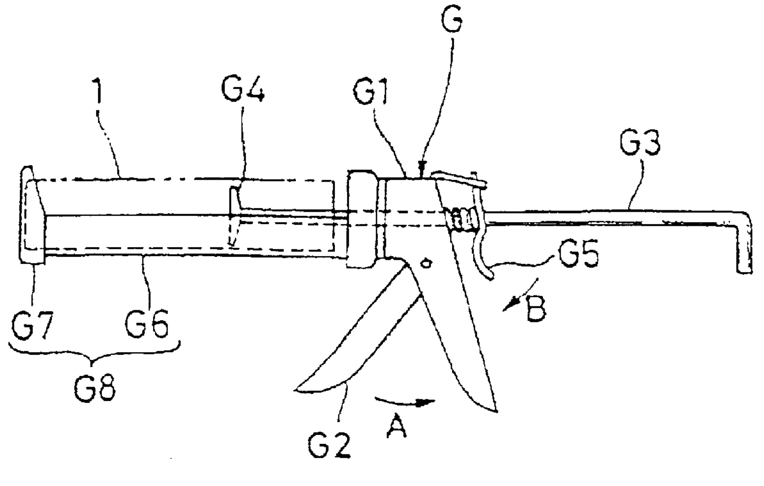
FIG. 6 is a side view illustrating an example of a dispensing gun, which is used to discharge fluid material from the cartridge as shown in FIG. 1.

A dispensing gun "G" as shown in FIG. 6 may be used as a dispensing apparatus for discharging the fluid material from the cartridge 1. The dispensing gun, which is well known, will be described briefly below. The dispensing gun "G" has a main body G1. The main body G1 is provided on the lower side with a lever G2, which is swingable. The swing motion of the lever G2 in a direction of an arrow "A" in FIG. 6 causes a rod G3 to advance (i.e., to move leftward in FIG. 6) so as to advance a piston G4, which is provided at the front end of the rod G3. The swing motion of an engaging piece member G5 in a direction of an arrow "B" in FIG. 6 permits a backward movement of the rod G3. The main body G1 has the front end portion to which a root end portion of a support arm G6 is fixed. The support arm G6 has a semi-cylindrical cross-section, which open upward. The support arm G6 extend forward and horizontally so that the piston G4 is movable back and forth along the support arm G6. A stopper member G7 having a short cylindrical shape is fixed to the front end of the support arm G6. The support arm G6 and the stopper member G7 form a support section G8 into which the cartridge 1 is fitted.

Figure 7:
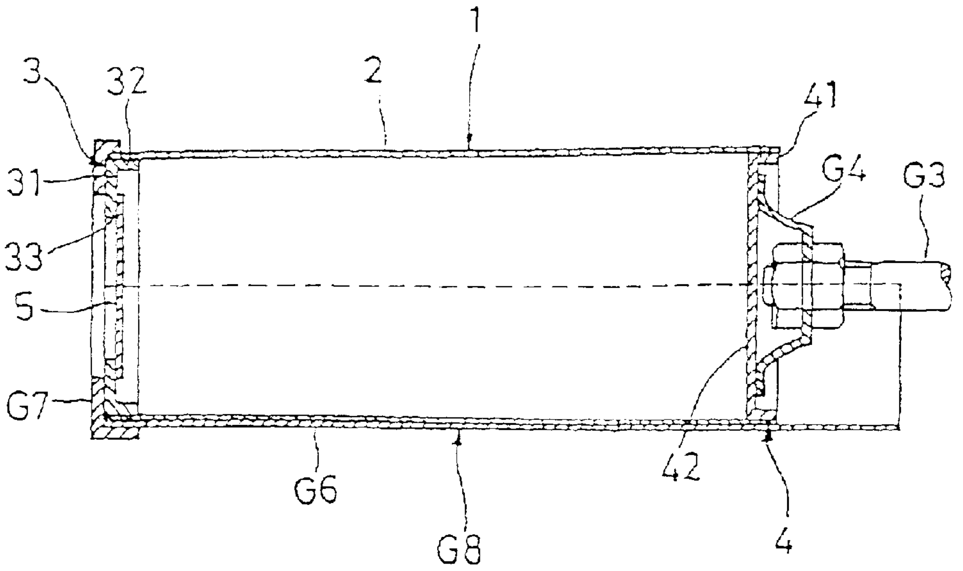
FIG. 7 is an enlarged sectional side view illustrating essential components of the dispensing gun as shown in FIG. 6.

When the fluid material is discharged from the cartridge 1 with the use of the dispensing gun "G", the rod G3 and the piston G4 are previously moved to their rearmost positions. The slits 51 or holes are previously formed on the sealing sheet 5 of the cartridge 1. The cartridge 1 is placed on the support arm G6 so that the cap member 3 is directed to the stopper member G7. The cartridge 1 is moved forward until the cap member 3 comes into contact with the stopper member G7. Then, operation of the lever G2 is made to advance the rod G3 and the piston G4. The piston G4 comes into contact with the pressure-receiving plate portion 42 of the plunger 4, as shown in FIG. 7. Further advance of the piston G4 causes the plunger 4 to advance further accordingly. The forward movement of the cartridge 1 is restricted by means of the stopper member G7. As a result, the plunger 4 slides to advance in the cartridge 1. The fluid material received in the cartridge 1 is therefore discharged outside from the slits 51 or the hole.

The advance of the plunger 4 causes the tubular receiver 2 to be pressed forward and compressed due to a frictional resistance applied to the interface between the outer peripheral surface of the plunger 4 and the inner peripheral surface of the tubular receiver 2. The tubular receiver 2 is formed of the thin film having almost no rigidity. If the tubular receiver 2 is not filled with fluid material, it can easily be collapsed under a pressing force generated by the plunger 4. However, the tubular receiver 2 is filled with fluid material in practice. Advance of the plunger 4 increases the pressure of the fluid material received in the tubular receiver 2. The pressure is uniformly applied over the entire inner surface of the tubular receiver 2. Consequently, the tubular receiver 2 is kept in a cylindrical shape in a bulging state so that the fluid material received in the tubular receiver 2 imparts the strength to the tubular receiver 2 to reinforce it. The tubular receiver 2 bears a compressive force generated by the plunger 4 in cooperation with the fluid material. There occurs neither collapse nor buckling of the tubular receiver 2 due to the compressive force of the plunger 4, although the tubular receiver 2 is formed of the thin film 21. It is therefore possible to discharge smoothly the fluid material received in the tubular receiver 2 without causing any problem.

The advance of the plunger 4 increases the pressure of the fluid material received in the cartridge 1. Such an increased pressure of the fluid material theoretically causes the fluid material to leak out thorough the gap portion 25 formed on the inner peripheral surface of the tubular receiver 2. However, the thin film 21 of which the tubular receiver 2 is formed has an extremely small thickness in practice and the depth of the gap portion 25 in the diametrical direction of the tubular receiver 2 is also extremely small. As a result, the fluid material does not leak out from the gap portion 25.

When the plunger 4 advances to reach the vicinity of the cap member 3 as shown in FIG. 1 in phantom lines so that almost all amount of fluid material is discharged from the cartridge 1, the piston G4 is moved backward to be placed outside the tubular receiver 2. Then, the cartridge 1 in which the fluid material has been used up is removed from the support section G8 so as to be subjected to disposal. Formation of the tubular receiver 2 of the thin film makes it possible to collapse the tubular receiver 2 in a small size. The cartridge 1 can therefore be disposed without being bulky.

Now, the other embodiments of the present invention will be described below. The following description of the embodiments includes only the description of the different structures from the first embodiment of the present invention described above. Description of the same structures is omitted, although the same reference numerals are allotted to them.

Figure 8:
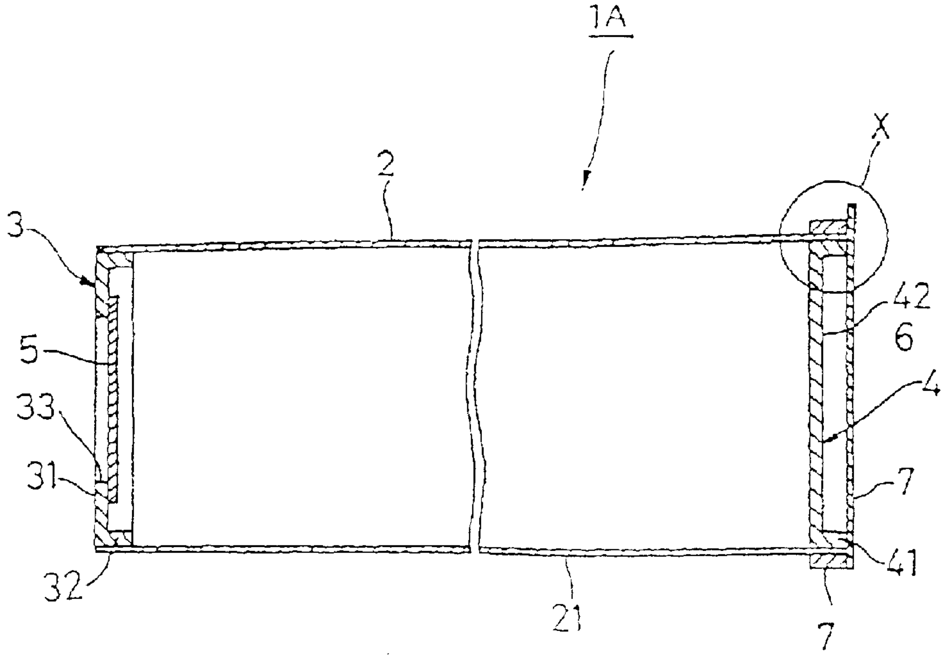
FIG. 8 is a longitudinal sectional view illustrating the cartridge of the second embodiment of the present invention.
Figure 9:
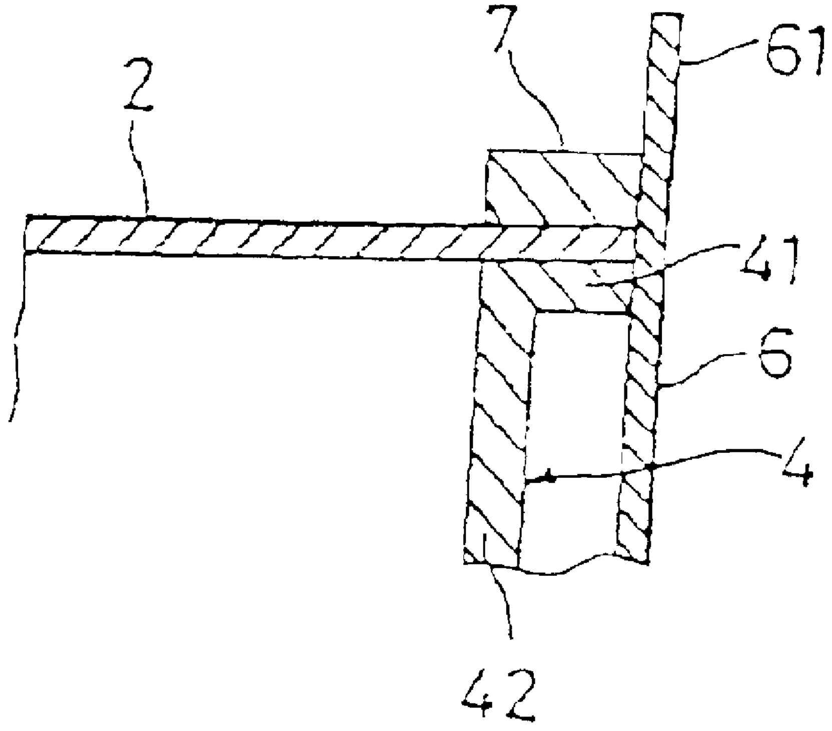
FIG. 9 is an enlarged view of a region surrounded by a circle X in FIG. 8.

FIGS. 8 and 9 illustrate the cartridge of the second embodiment of the present invention. In the cartridge 1A of the second embodiment of the present invention, the tubular receiver 2 is provided on the outer peripheral surface of the rear end with a reinforcement member (stopper member) 7. The reinforcement member 7, which is formed of a relatively hard resin into a short cylindrical shape, is fitted on the outer peripheral surface of the rear end of the tubular receiver 2 and secured thereto. The reinforcement member 7 maintains the circular shape of the rear end of the tubular receiver 2, thus making it possible to insert easily the plunger 4 into the inner peripheral surface of the rear end of the tubular receiver 2. The reinforcement member 7 has a prescribed thickness so as to project outwardly from the outer peripheral surface of the rear end of the tubular receiver 2 in the diametrical direction thereof accordingly. It is preferable to apply the insertion injection method to form the reinforcement member 7, while fixing the reinforcement member 7 to the tubular receiver 2 in the similar manner to the cam member 3 described above.

Figure 10:
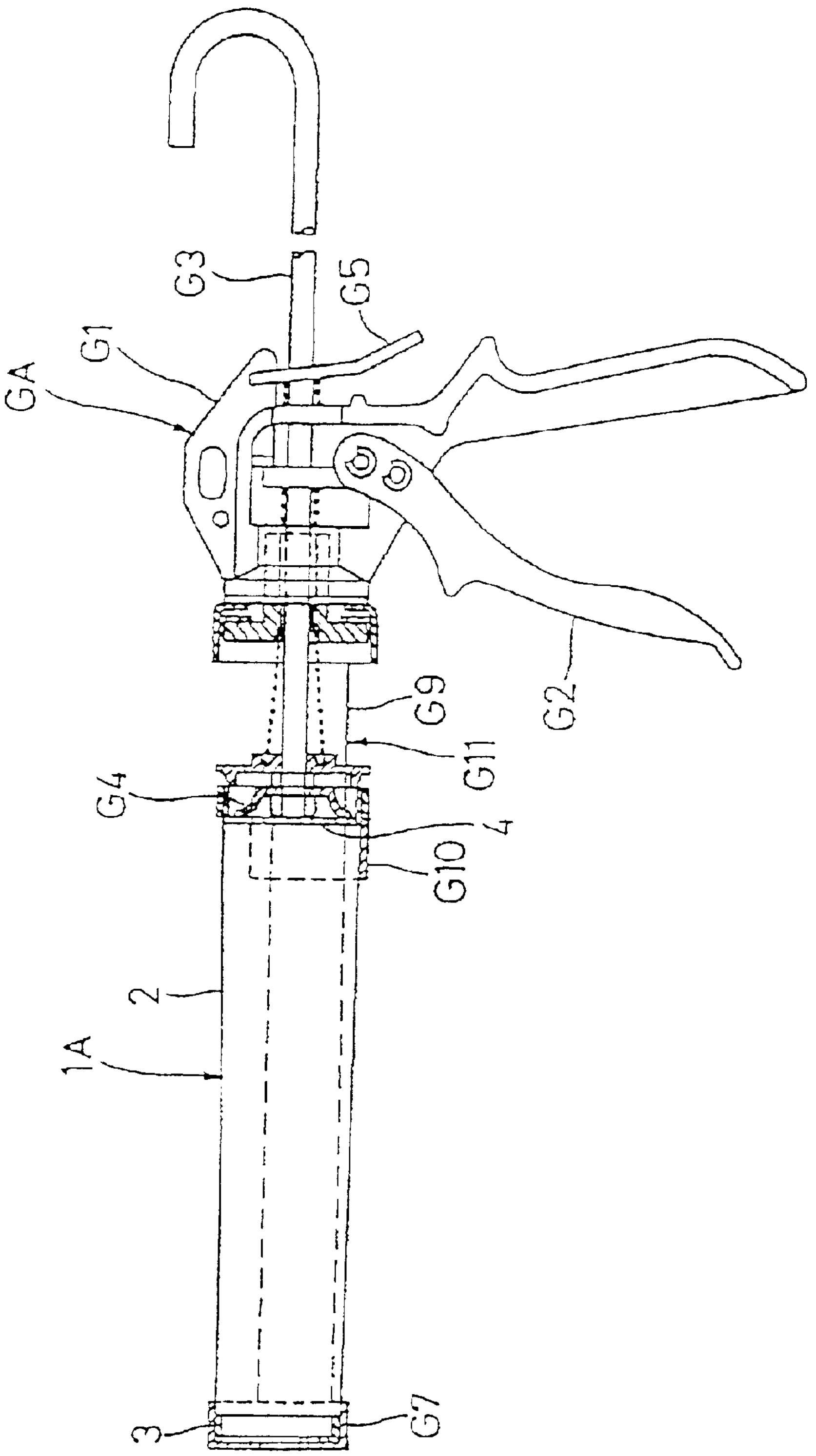
FIG. 10 is a side view illustrating the dispensing gun of the first embodiment of the present invention, which is used to discharge the fluid material from the cartridge as shown in FIG. 8.
Figure 12:
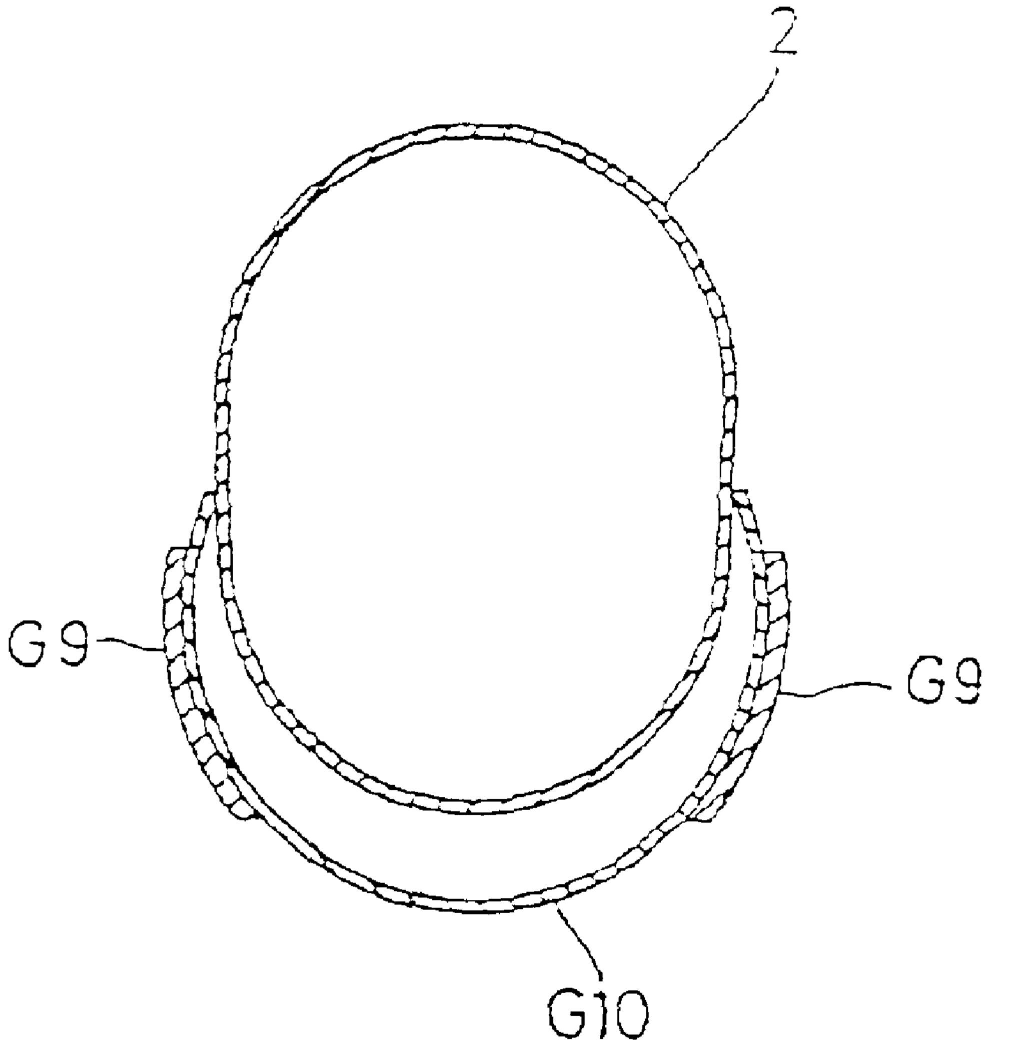
FIG. 12 is a cross-sectional view cut along the line XII—XII in FIG. 11.

FIG. 10 illustrates an embodiment of the dispensing gun (i.e., the dispensing apparatus) of the present invention. The dispensing gun GA, which is used to discharge the fluid material from the cartridge 1A having the above-described structure, is provided with a pair of support arms G9, G9 that extend forward and horizontally in parallel to each other, in place of the support arm G6 of the above-described dispensing gun G. An engaging member G10 is fixed to the opposite surfaces of the rear end portions of the support arms G9, G9. The engaging member G10 has an arc-shape in cross-section as shown in FIG. 12. The engaging member G10 has the circumferential length, which is slightly longer than half a circumferential length of the corresponding circle. The engaging member G10 is fixed to the support arms G9, G9 so that the opening of the engaging member G10 is directed upward. The inner peripheral surface of the engaging member G10 has a curvature, which is substantially identical to the curvature of the outer peripheral surface of the rear end portion of the tubular receiver 2. In the dispensing gun GA, the support arms G9, G9 and the stopper member G7 form a support section G11.

When the cartridge 1A is fitted on the support section G11 of the dispensing gun GA, the cartridge 1A is inserted into the engaging member G10 from its opening so that the front end of the cartridge 1A is directed to the front end of the dispensing gun G. The width of the opening of the engaging member G10 is slightly smaller than the diameter of the tubular receiver 2. In view of this fact, the tubular receiver 2 can be inserted into the engaging member G10 by deforming the tubular receiver 2 into an oval shape as shown in FIG. 12. Then, the cartridge 1A is moved to the front side of the dispensing gun GA so that the front end of the reinforcement member 7 comes into contact with the rear end of the engaging member G10, thus restricting the further forward movement of the cartridge 1A. In this state, the front face of the tubular receiver 2 comes into contact with the stopper member G7 or is placed so that a small gap is formed between the front face of the tubular receiver 2 and the stopper member G7. The cartridge 1A is prevented from moving forward by means of the engaging member G10. In the cartridge of the embodiment of the present invention, the reinforcement member 7 also serves as the stopper member.

When the fluid material is discharged from the cartridge 1A, which has been fitted into the dispensing gun GA, operation of the piston G4 advances the plunger 4. The reinforcement member 7 engages with the engaging member G10 to restrict the forward movement of the cartridge 1A so that the plunger 4 advances relative to the cartridge 1A. As a result, the fluid material is discharged from the cartridge 1A. The cartridge 1A can be applied until the plunger 4 comes into contact with the cap member 3. This state means completion of discharge of the fluid material from the cartridge 1A to be used up. After discharge of the fluid material is completed, the cartridge 1A is removed from the support section G11 to be subjected to disposal. The tubular receiver 2, which forms the major part of the cartridge 1A, is formed of the thin film 21, thus making it possible to collapse the cartridge 1A in a small size to be subjected to disposal.

The advance of the plunger 4 relative to the cartridge 1A imparts a pressing force having a function of moving forward the cartridge 1A to the cartridge 1A due to a frictional resistance applied to the interface between the outer peripheral surface of the plunger 4 and the inner peripheral surface of the tubular receiver 2, in the same manner as the first embodiment of the present invention. In the cartridge 1 of the first embodiment, the tubular receiver 2 bears the compressive force generated by the frictional resistance, in cooperation with the fluid material received in the tubular receiver 2 under pressure. On the contrary, in the cartridge 1A of the second embodiment of the present invention, the reinforcement member 7 restricts the forward movement of the cartridge 1A in cooperation with the engaging member G10 so that the force generated by the frictional resistance serves as tensile stress applied to the tubular receiver 2. As a result, no collapse of the tubular receiver 2 occurs.

Figure 13:
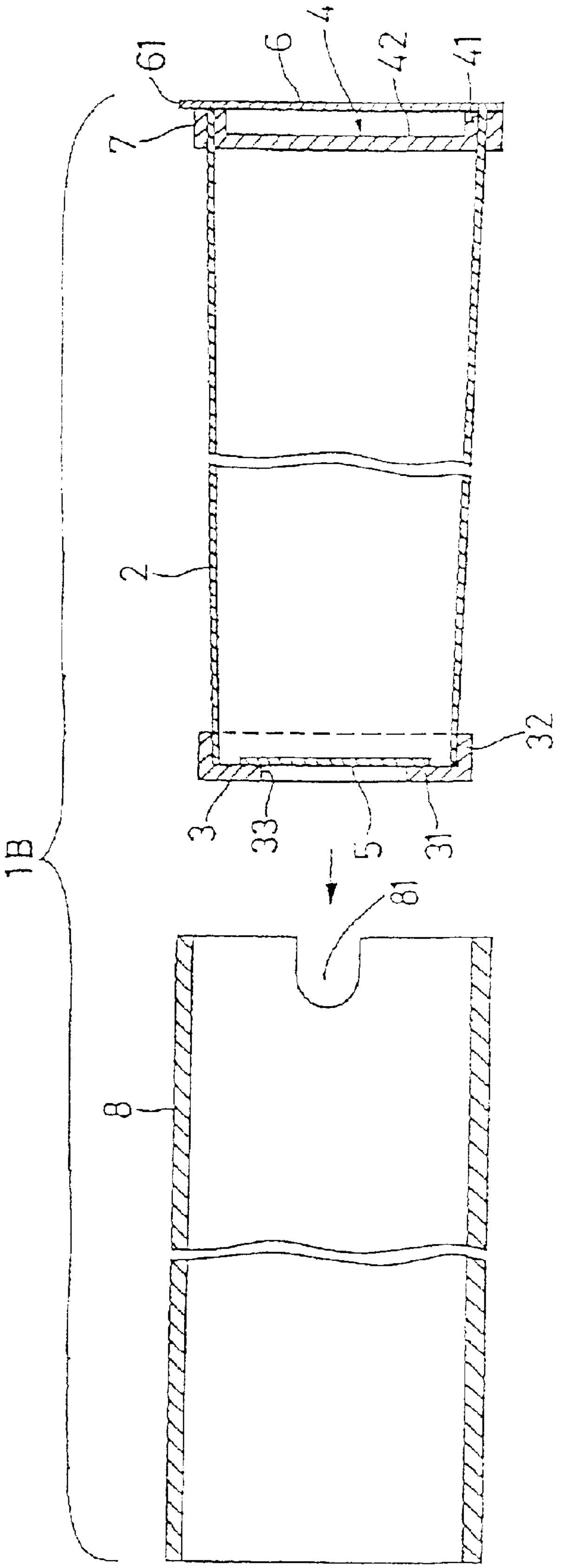
FIG. 13 is an exploded sectional view illustrating the cartridge of the third embodiment of the present invention.

FIG. 13 illustrates the cartridge of the third embodiment of the present invention. The cartridge 1B of the third embodiment further comprises an outer tube 8 in addition to the components of the cartridge 1A of the second embodiment of the present invention. The outer tube 8 is a tubular body having the constant inside diameter and the constant outer diameter in the longitudinal direction. These inner and outer diameters are substantially identical to the inner and outer diameters of the reinforcement member 7. The outer tube 8 has a whole length, which is substantially equal to or slightly larger than the distance between the front end face of the reinforcement member 7 and the front end face of the cap member 3. Consequently, when the cartridge 1A is inserted from the cap member 3 side into the outer tube 8 until the reinforcement member 7 comes into contact with the rear end of the outer tube 8, the outer tube 8 receives therein the tubular receiver 2 and the cap member 3 other than the reinforcement member 7. The outer tube 8 is provided at its rear end portion with a plurality of recesses 81, which are placed at intervals in the circumferential direction of the outer tube 8. These recesses 81 permit an operator to insert his/her thumb and index or middle finger into the recesses 81 to pinch the reinforcement member 7 of the cartridge, thus facilitating an operation of removing the tubular receiver 2 and its attachments from the outer tube 8. The above-mentioned pinching operation and a subsequent pulling operation to move the reinforcement member 7 away from the outer tube 8 provide an easy removal of the tubular receiver 2 and its attachment from the outer tube 8. The reinforcement member 7 is not inserted into the outer tube 8. It is therefore possible to pinch the reinforcement member 7 with the thumb and index or middle finger without utilizing the recesses 81. In view of this fact, the recesses 81 are not necessarily formed.

Figure 14:
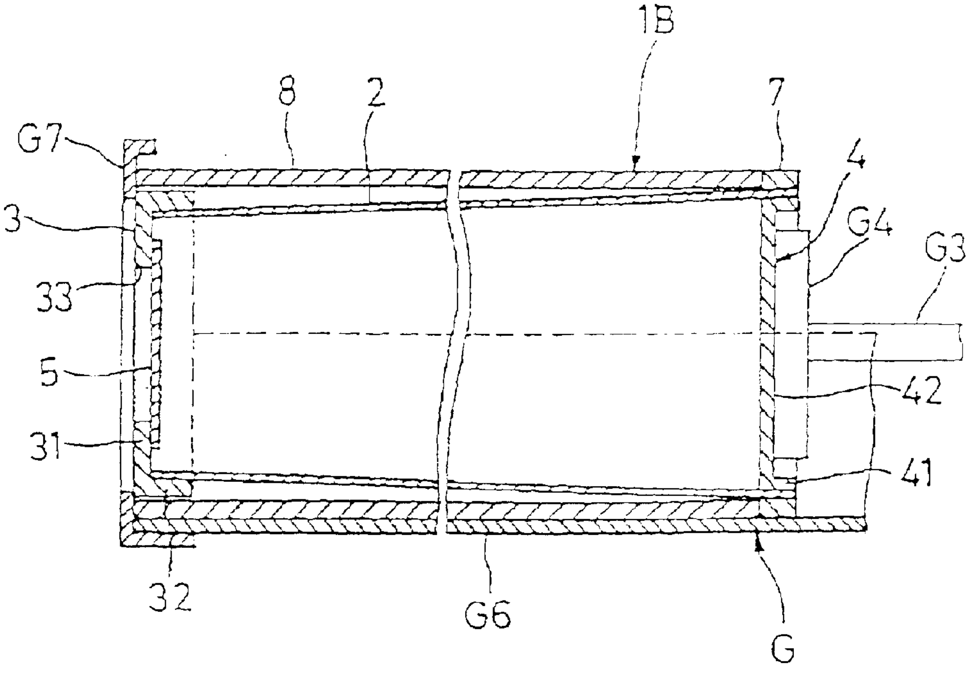
FIG. 14 is an enlarged sectional side view illustrating the essential components in a state where the fluid material is discharged from the cartridge as shown in FIG. 13 with the use of the dispensing gun as shown in FIG. 6.

FIG. 14 illustrates a state where the fluid material is discharged from the cartridge 1B having the above-described structure with the use of the dispensing gun G. When the fluid material is discharged from the cartridge 1B, the tubular receiver 2 and the cap member 3 (hereinafter referred to as the "receiver unit 2") are inserted into the outer tube 8. The receiver unit 2 is placed so that the cap member 3 thereof faces the rear end of the outer tube 8, which is provided with the recesses 81, as shown in FIG. 13. The receiver unit 2 is inserted into the outer tube 8 until the reinforcement member 8 comes into contact with the rear end of the outer tube 8, having the recesses 81. Then, the cartridge 1B is supported on the supporting arm G6 and the outer tube 8 is brought into contact with the stopper member G7, as shown in FIG. 14. The piston G4 advances to come into contact with the plunger 4 of the cartridge 1B. The fluid material is discharged from the cartridge 1B in the same manner as the embodiments in which the cartridge 1(1A) and the dispensing gun G(GA).

Also in the cartridge 1B of the third embodiment of the present invention, tensile stress is merely applied to the tubular receiver 2, which is formed of the thin film 21, upon discharging the fluid material, and no compressive force is applied to the tubular receiver 2. It is therefore possible to discharge smoothly the fluid material from the cartridge 1B, without collapsing the tubular receiver 2. When almost all amount of the fluid material is discharged from the cartridge 1B, the piston G4 is removed from the cartridge 1B. Then, the receiver unit 2, i.e., the united body of the tubular receiver 2, the cap member 3, the reinforcement member 7, the plunger 4 and the sealing sheet 5 is subjected to disposal. The tubular receiver 2 can also be collapsed in a small size to reduce a volume of waste in the same manner as the above-described embodiments. The outer tube 8 is not subjected to disposal and used repeatedly. In the cartridge 1B of the third embodiment of the present invention in which the outer tube is used, the single outer tube 8 suffices for the single dispensing gun G, with the result that there is no need to manufacture the outer tubes 8 in a large amount. This may reduce manufacturing cost. The conventional dispensing gun may be applied to the cartridge 1B, thus providing useful effects.

Figure 15:
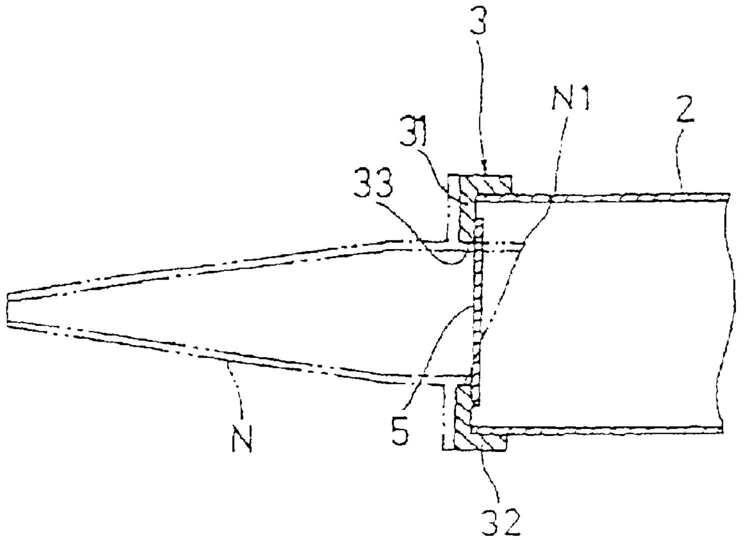
FIG. 15 is a sectional view illustrating a nozzle, which is fitted to the cartridge of the present invention.

FIG. 15 illustrates another method for discharging the fluid material from the above-described cartridge 1, 1A or 1B. A nozzle N is fitted into the outlet opening 33 of the cap member 33 and secured thereto. The nozzle N is provided at its rear end with a sharp cutting portion N1, which can pierce into the sealing sheet 5 so that the inside of the nozzle N communicates with the inside of the tubular receiver 2. It is therefore possible to discharge the fluid material through the nozzle N by advancing the plunger 4 in the same manner as the above-described embodiments.

Figure 16:
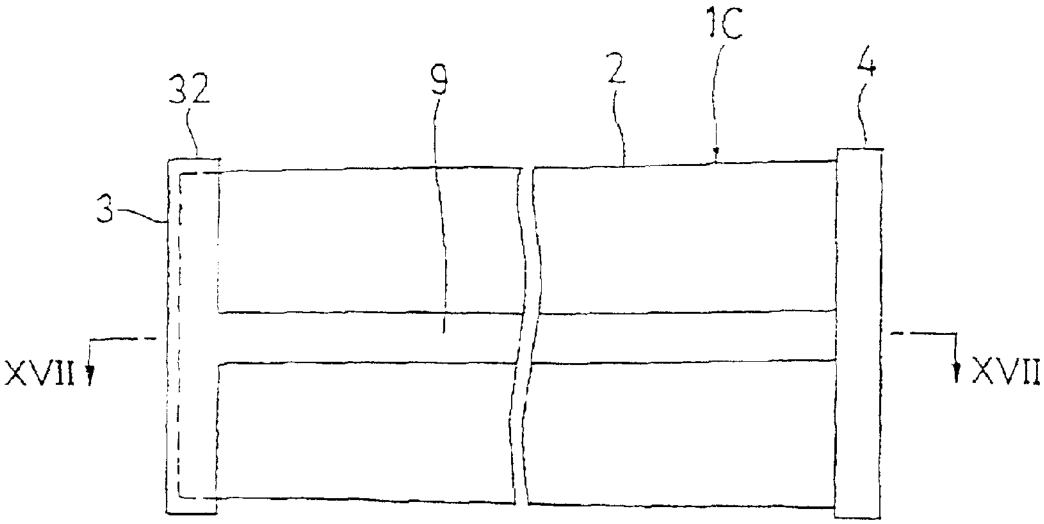
FIG. 16 is a side view illustrating the cartridge of the fourth embodiment of the present invention.
Figure 17:
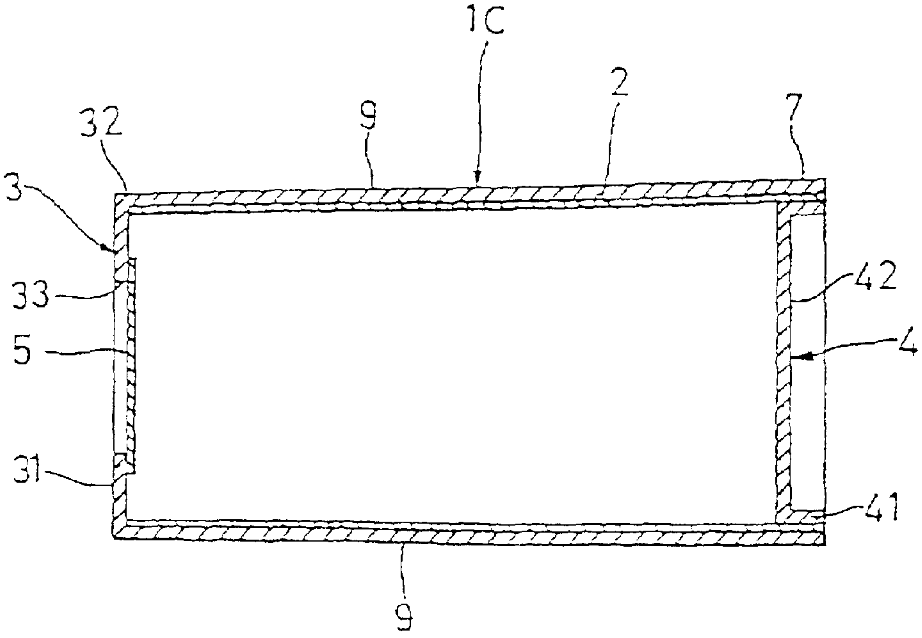
FIG. 17 is a sectional view cut along the line XVI—XVI in FIG. 16.

FIGS. 16 and 17 illustrate the cartridge of the fourth embodiment of the present invention. The cartridge 1C of the fourth embodiment has a plurality of reinforcing ribs 9 (i.e., two reinforcing ribs in the fourth embodiment), which are disposed between the sleeve portion 32 of the cap member 3 and the stopper member G7. The reinforcing ribs 9 are placed at intervals in the circumferential direction of the tubular receiver 2. It is preferable to form the reinforcing ribs 9 integrally with the cap member 3 and the reinforcement member 7 by an insertion injection method. When such an insertion injection method is applied to form the reinforcing ribs 9, the reinforcing ribs 9 are formed integrally with the cap member 3 and the reinforcement member 7, while securing the reinforcing ribs 9, the cap member 3 and the reinforcement member 7 on the outer surface of the tubular receiver 2.

The conventional dispensing gun G can be utilized to discharge the fluid material from the cartridge 1C having the above-described structure. The cartridge 1C, which is to be substituted for the cartridge 1, is fitted into the support section G8 of the dispensing gun G as shown in FIGS. 6 and 7. In this case, the cap member 3 of the cartridge 1C comes into contact with the stopper member G7. The piston G4 is operated to move the plunger 4 to move forward, so as to discharge the fluid material from the cartridge 1C.

The forward movement of the plunger 4 generates force having a function of pressing the cartridge 1C. When such force is relatively large, the tubular receiver 2 and the fluid material received therein cannot sufficiently bear such force. In the cartridge 1C, the reinforcing ribs 9 bears part of the above-mentioned force, which cannot be born by the tubular receiver 2 and the fluid material. It is therefore possible to prevent the tubular receiver 2 from collapsing, even when the force applied to the cartridge 1C is relatively large. It is preferable to minimize the thickness (strength) of the reinforcing ribs 9 to the extent that collapse of the tubular receiver 2 does not occur.

The tubular receiver 2 tapers off from the rear end to the front end. Accordingly, the distance between the reinforcing ribs 9 in the diametrical direction of the tubular receiver 2 gradually decreases from the rear end to the front end. In view of such a structure, the reinforcing ribs 9 have a theoretical function of resisting the forward movement of the plunger 4 at the gradually increased resistance according as the plunger 4 reaches the cap member 3. The advance of the plunger 4 causes in practice the tubular receiver 2 to expand so that the distance between the reinforcing ribs 9 is also expanded. Therefore, the reinforcing ribs 9 do not provide any adverse effects on the forward movement of the plunger 4.

When the cartridge 1C in which the fluid material received therein has been used up is subjected to disposal, the tubular receiver 2 is collapsed so that the opposite portions thereof placed between the two reinforcing ribs 9, 9 come closely each other, thus reducing a volume of the waste of the cartridge 1C.

Figure 18:
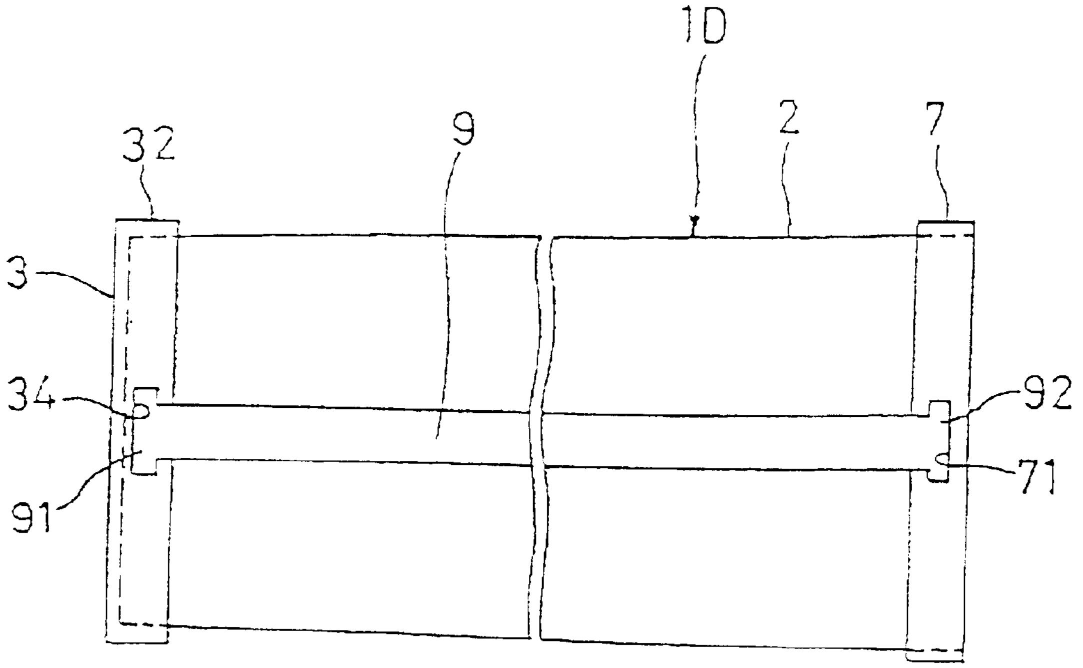
FIG. 18 is a side view illustrating the cartridge of the fifth embodiment of the present invention.
Figure 19A:
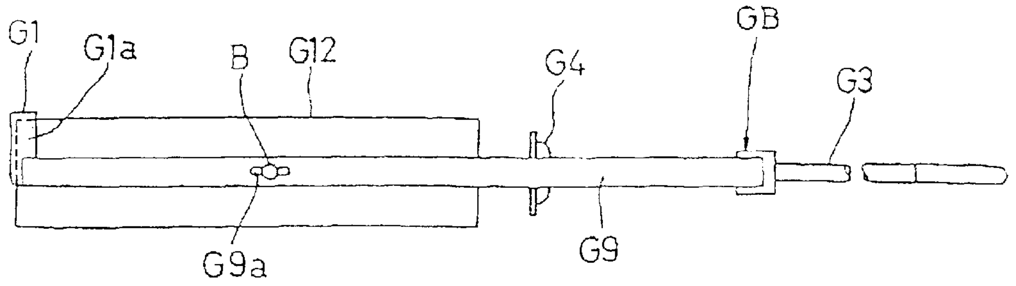
FIG. 19(A) is a plan view illustrating the dispensing gun of the second embodiment of the present invention.
Figure 19B:
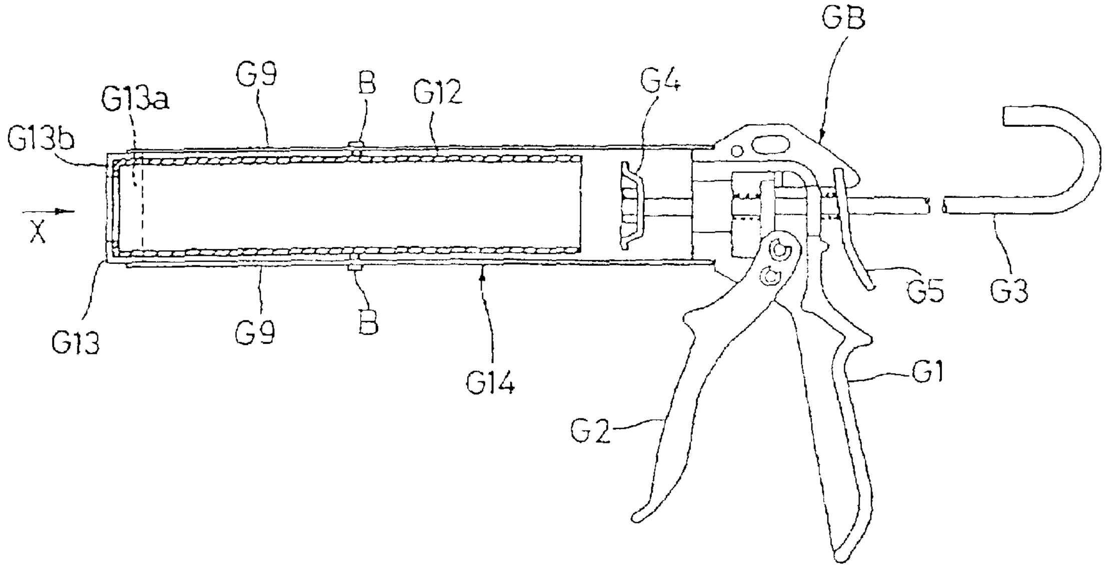
FIG. 19(B) is a side view of the dispensing gun as shown in FIG. 19(A) and FIG. 19(C) is a view illustrating the end contour in a viewing direction X in FIG. 19(B)
Figure 19C:
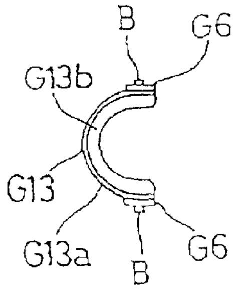
Figure 20:
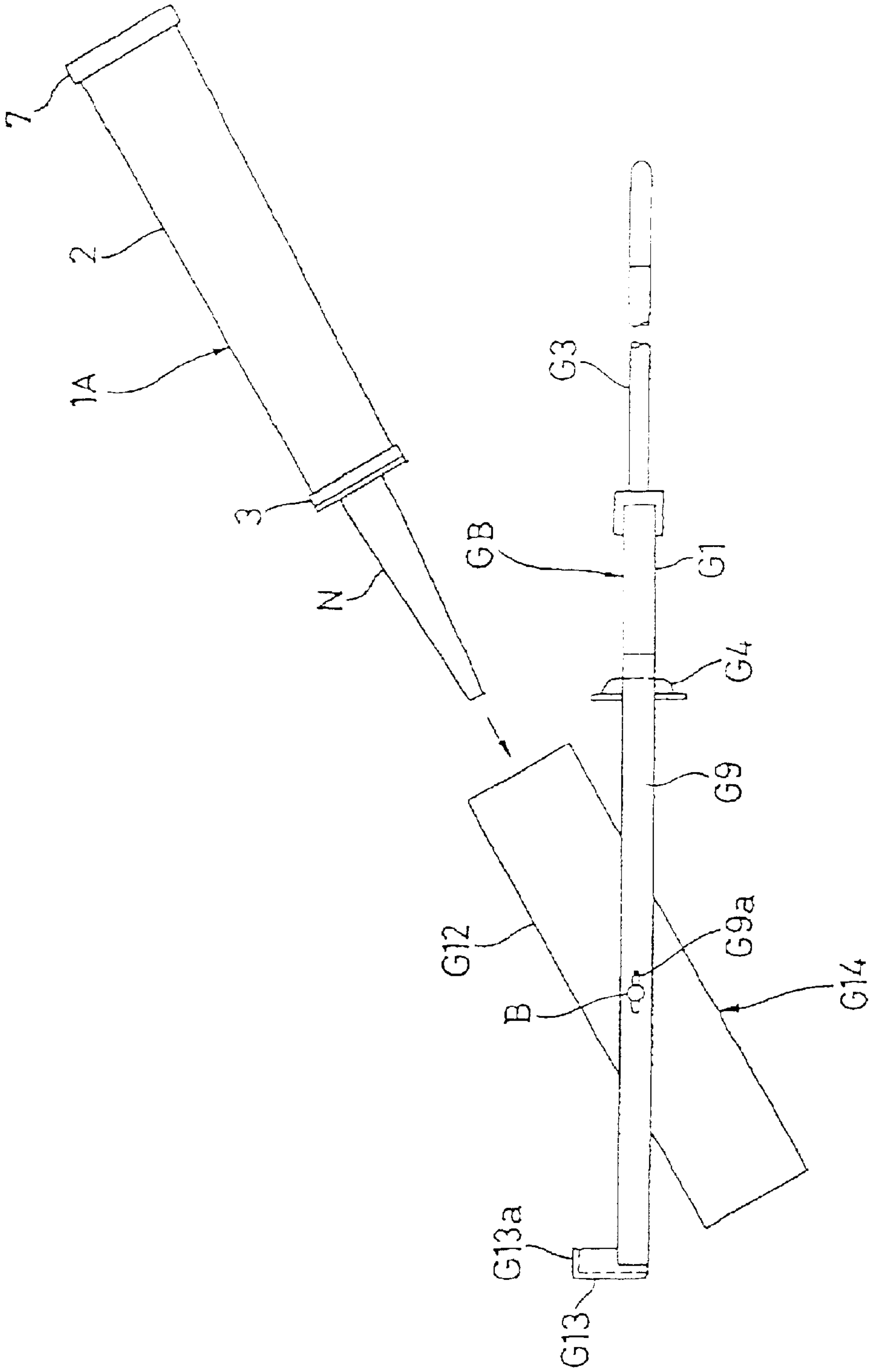
FIG. 20 is a plan view illustrating a state where the cartridge is fitted to the dispensing gun as shown in FIG. 19(A)
Figure 21:
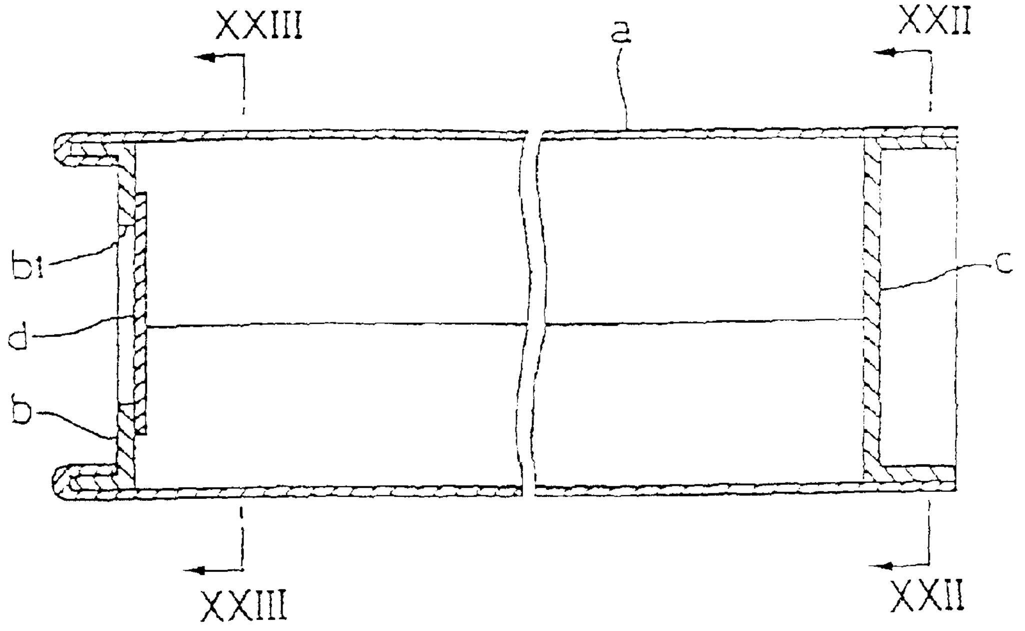
FIG. 21 is a sectional view illustrating the conventional cartridge.
Figure 22:
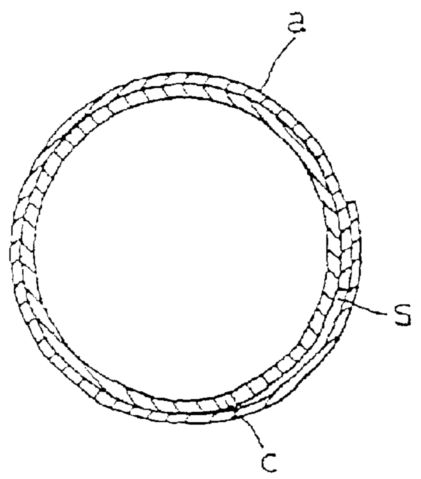
FIG. 22 is a cross-sectional view cut along the line XXII—XXII in FIG. 21.
Figure 23:
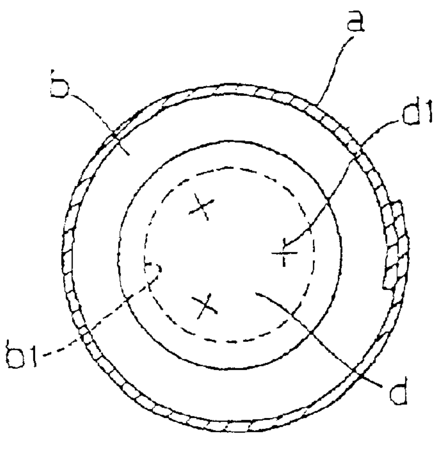
FIG. 23 is a cross-sectional view cut along the line XXIII—XXIII in FIG. 21.

FIG. 18 illustrates the cartridge of the fifth embodiment of the present invention. In the cartridge 1D of the fifth embodiment, the reinforcing ribs 9 are formed separately from the cap member 3 and the reinforcement member 7. Each of the reinforcement members 9 is provided at the opposite edges with engaging portions 91, 92 having a T-shape. The sleeve portion 32 of the cap member 3 and the peripheral portion of the reinforcement member 7 are provided with recess portions 34, 71, respectively, into which the above-mentioned engaging portions 91, 92 are detachably fitted, respectively. The opposite ends of the reinforcing rib 9 are detachably connected to the cap member 3 and the reinforcement member 7, respectively, by fitting the engaging portions 91, 92 of the reinforcing rib 9 into the recess portions 34, 71 of the cap member 3 and the reinforcement member 7, respectively. The other structural components are identical to those of the above-described cartridge 1C.

When the cartridge 1D of the fifth embodiment in which the fluid material has been discharged is subjected to disposal, the reinforcing ribs 9 are removed from the cap member 3 and the reinforcement member 7. The reinforcing ribs 9 and the other structural components are subjected separately to disposal. The reinforcing rib 9 has a small thickness. A volume of the waste of the other structural components including the tubular receiver 2 can be decreased by collapsing the tubular receiver 2 in a small size. As a result, the size of the whole cartridge 1D can be made small to be subjected to disposal.

Now, description will be given below of the other embodiment of the dispensing gun (i.e., the dispensing apparatus) of the present invention with reference to FIGS. 19(A) to 19(C) and 20. The dispensing gun GB of this embodiment in which the cartridge 1A as shown in FIG. 8, more specifically, the cartridge 1A having the nozzle fitted thereto is used, has a pair of supporting arms G9, G9 that are disposed in parallel to face each other. In this embodiment, the pair of supporting arms G9, G9 are placed on the vertical plane so as to face each other and extend horizontally. Each of the pair of supporting arms G9, G9 is provided with a slot G9*a* extending in the longitudinal direction of the support arm G9. A screw B passes through the slot G9*a* so as to be slidable therein and swingable. The screw B has an axial line, which is perpendicular to the longitudinal direction of the supporting arm G9.

A support tube G12 is placed between the pair of supporting arms G9, G9. The support tube G12 is formed into a cylindrical shape having a constant diameter. The inside diameter of the support tube G12 is substantially identical to the outside diameter of the rear end portion of the tubular receiver 2 (equal to the inside diameter of the reinforcement member 7). The support tube G12 has a length, which is substantially equal to or slightly longer than the distance between the front face of the cap member 3 and the front face of the reinforcement member 7. The above-described screw B is secured to the central portion of the support tube G12. As a result, the support tube G12 is supported on the supporting arms G9, G9 so as to be swingable in a direction perpendicular to the supporting arms G9, G9 (i.e., a horizontal direction) and slidable in the longitudinal direction of the supporting arms G9, G9. The range of movement of the support tube G12 in the longitudinal direction of the supporting arms G9, G9 is determined by the length of the slot G9*a*.

In the dispensing gun GB, there is used a stopper member G13, which is substituted for the above-described stopper member G7. The stopper member G13, which is formed into a clevis-shape, i.e., a horseshoe-shape, has the opposite portions on its outer peripheral surface, on which the supporting arms G9 are fixed. The stopper member G13 has an opening portion, which opens in a direction perpendicular to the longitudinal direction of the supporting arms G9. The front end portion of the support tube G12 can be inserted into the stopper member G13 from the opening portion thereof and removed therefrom. When the front end portion of the support tube G12 is inserted into the stopper member G13 so as to come into contact with a semi-cylindrical portion G13*a* of the stopper member G13, the support tube G12 becomes in parallel to the supporting arms G9 so that the opening at the rear end side of the support tube G12 face the piston G4. In such a state, the forward movement of the support tube G12 brings the front end face of the support tube G12 into contact with a bottom portion G13*b* of the stopper member G13, thus preventing the further forward movement of the support tube G12. In the dispensing gun GB, the supporting arms G9, the support tube G12 and the stopper member G13 form the support section G14. The other structural components are identical to those of the above-described dispensing gun GA.

When the fluid material is discharged from the cartridge 1 with the use of the above-described dispensing gun GB, the support tube G12 swings relative to the supporting arms G9 so that the former intersects the latter. Such an operation causes the opening of the rear end of the support tube G12 to deviate from the piston G4. The cartridge 1A to which the nozzle N has been attached, is inserted from its nozzle N side into the support tube G12. When such an insertion operation is carried out until the reinforcement member 7 of the cartridge 1 comes into contact with the rear end of the support tube G12, the support tube G12 is then swung so that the front end of the support tube G12 comes into contact with the semi-cylindrical portion G13*a* of the stopper member G13. The semi-cylindrical shape of the stopper member G13 permits the nozzle N to be inserted easily into the stopper member G13. Then, the support tube G12 moves forward so that the front end thereof comes into contact with the bottom portion G13*b* of the stopper member G13. Operation of the piston G4 advances the plunger 4 to discharge the fluid material received in the cartridge 1A from the nozzle N. Here, frictional force generated along with the advance of the plunger 4 acts as tensile stress applied to the tubular receiver 2. Consequently, no collapse of the tubular receiver 2 occurs during discharging the fluid material. The tensile stress applied to the tubular receiver 2 is born by the stopper member G13 through the reinforcement member 7 and the support tube G12. After the fluid material has completely been discharged from the cartridge 1, the piston G4 is removed from the support tube G12. Then, the support tube G12 swings at a certain angle to remove the cartridge 1A from the support tube G12. The cartridge 1A is then subjected to disposal.

Figure 11:
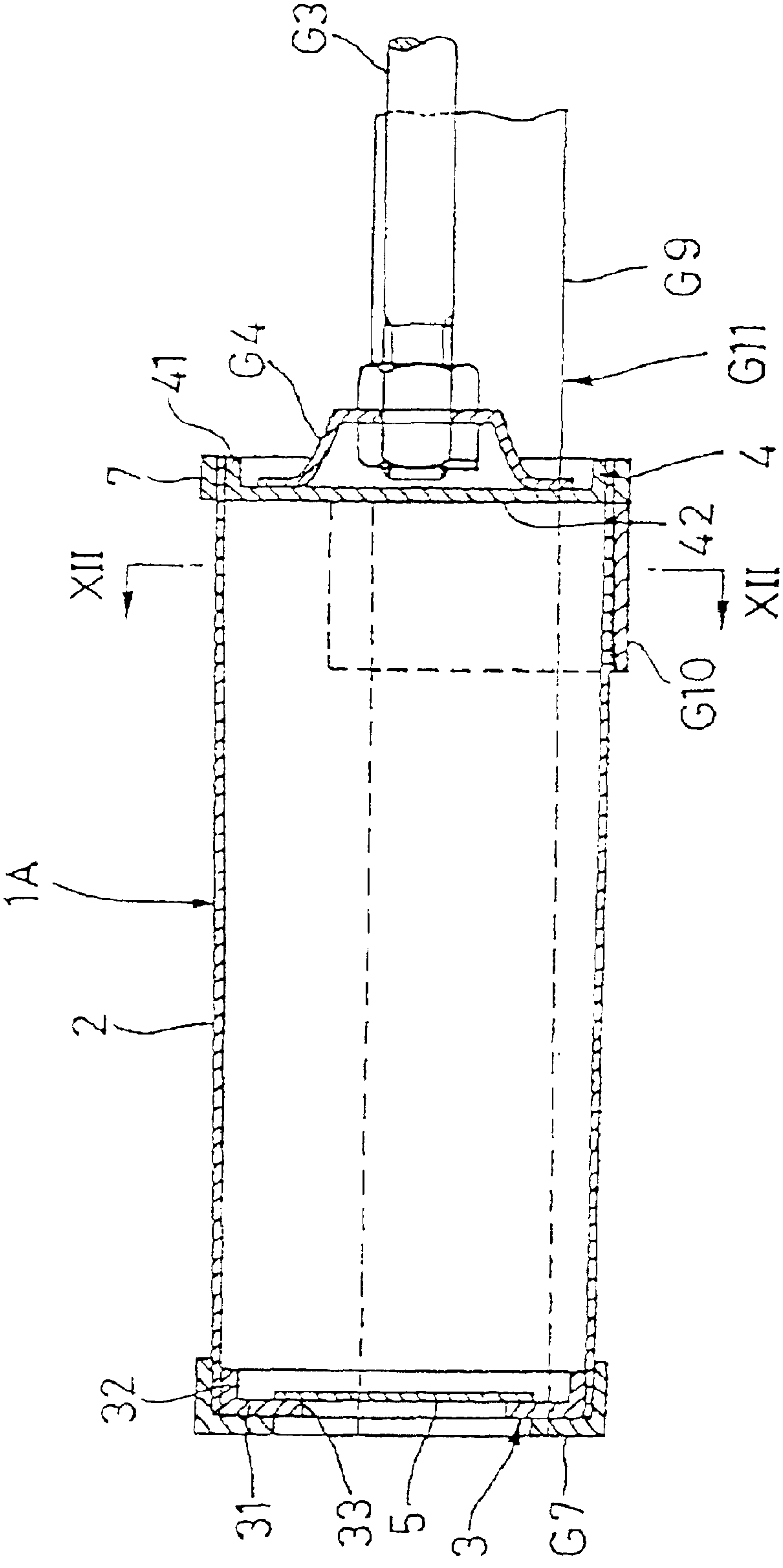
FIG. 11 is an enlarged cross-sectional side view illustrating essential components of the dispensing gun as shown in FIG. 10.

In the dispensing gun GB, the stopper member G13 determines the forward movement limit of the support tube G12. The above-mentioned screws B may determine such a limit. In this case, the stopper member G13 has only the function of determining the swing range of the support tube G12. Accordingly, the bottom portion G13*b* may be omitted from the stopper member G13. In case where the nozzle N is not attached to the cartridge 1A, the stopper member G7 of the dispensing gun GA as shown in FIGS. 10 and 11 may be substituted for the above-described stopper member G13.

The present invention is not limited only to the above-described embodiments and includes modifications.

In the above-described embodiments, the reinforcement member is provided on the outer peripheral surface of the tubular receiver 2 at the rear end thereof. However, the reinforcement member 7 may be provided on the inner peripheral surface of the tubular receiver 2 at the rear end thereof. In such a case, the reinforcement member 7 is placed between the plunger 4 and the rear end of the tubular receiver 2.

In the above-described embodiments, the reinforcement member 7 also serves as the stopper member, which is formed into a ring-shape. In case where there is no requirement that the reinforcement member 7 also serves as the stopper member, the stopper member is not necessarily formed into a ring-shape, but may be composed of a plurality of projections, which are disposed at intervals on the circumferential direction of the tubular receiver 2.

According to the present invention as described in detail, it is possible to provide the cartridge, which can be collapsed in a small size to be subjected to disposal and prevent the fluid material from leaking from interface between the tubular receiver and the plunger. It is also possible to provide the dispensing apparatus, which permits to discharge the fluid material from the cartridge without collapsing the tubular receiver, which is formed of the thin film, in use.

What is claimed is:

1. A cartridge for fluid material, which comprises:

a tubular receiver provided at its front end portion with an outlet opening; and a plunger disposed in said tubular receiver at its rear end portion so as to be slidable therein, wherein:

said tubular receiver is formed of a thin film and tapers off from the rear end portion thereof to the front end portion thereof.

2. The cartridge as claimed in claim 1, wherein:

said tubular receiver is provided on its outer peripheral surface at a rear end thereof, in which said plunger is fitted, with a reinforcement member having a ring-shape.

3. The cartridge as claimed in claim 1, wherein:

said tubular receiver is provided on its inner peripheral surface between the rear end portion thereof and said plunger with a reinforcement member having a ring-shape.

4. The cartridge as claimed in claim 1, wherein:

said tubular receiver is provided on its outer peripheral surface at a rear end thereof with at least one stopper member, said stopper member projecting outwardly in a diametrical direction of said tubular receiver.

5. The cartridge as claimed in claim 4, wherein:

said stopper member is formed into a ring-shape.

6. The cartridge as claimed in claim 4, further comprising:

an outer tube having rigidity, into which said tubular receiver is to be detachably inserted from the front end portion thereof, said outer tube having an end, which is to be brought into contact with said stopper member of said tubular receiver so as to prevent said tubular receiver from moving relative to said outer tube in a direction from the rear end portion of said tubular receiver toward the front end portion thereof.

7. The cartridge as claimed in claim 5, further comprising:

an outer tube having rigidity, into which said tubular receiver is to be detachably inserted from the front end portion thereof, said outer tube having an end, which is to be brought into contact with said stopper member of said tubular receiver so as to prevent said tubular receiver from moving relative to said outer tube in a direction from the rear end portion of said tubular receiver toward the front end portion thereof.

8. The cartridge as claimed in claim 1, wherein:

said tubular receiver has on its outer peripheral surface a plurality of reinforcing ribs extending in a longitudinal direction of said tubular receiver, each of said plurality of reinforcing ribs having opposite ends, which are connected to the rear end portion and the front end portion of said tubular receiver, respectively, so as to prevent said tubular receiver from being collapsed in the longitudinal direction thereof.

9. The cartridge as claimed in claim 8, wherein:

the opposite ends of each of said plurality of reinforcing ribs are detachably connected to the rear end portion and the front end portion of said tubular receiver, respectively.

* * * * *